United States Patent
Shen et al.

(10) Patent No.: US 9,178,809 B1
(45) Date of Patent: Nov. 3, 2015

(54) END-TO-END TRAFFIC ENGINEERING LABEL SWITCHED PATHS IN SEAMLESS MPLS

(71) Applicant: Juniper Networks, Inc., Sunnyvale, CA (US)

(72) Inventors: Yimin Shen, Shrewsbury, MA (US); Wen Lin, Andover, MA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 13/933,054

(22) Filed: Jul. 1, 2013

(51) Int. Cl.
*H04L 12/28* (2006.01)
*H04L 12/723* (2013.01)

(52) U.S. Cl.
CPC ..................................... *H04L 45/50* (2013.01)

(58) Field of Classification Search
CPC ............................. H04L 45/507; H04L 47/12
USPC ......................................................... 370/392
See application file for complete search history.

(56) References Cited

U.S. PATENT DOCUMENTS

| 7,184,437 | B1 | 2/2007 | Cole et al. | |
|---|---|---|---|---|
| 2003/0137983 | A1* | 7/2003 | Song | 370/395.4 |
| 2013/0266006 | A1* | 10/2013 | Dutta et al. | 370/389 |

OTHER PUBLICATIONS

G. Wright et al., 'CR-LDP Extensions for Interworking with RSVP-TE', Mar. 2000, MPLS Working Group, pp. 1-26.*
Leymann et al., "Seamless MPLS Architecture," draft-ietf-mpls-seamless-mpls-02, Internet-Draft, MPLS Working Group, Oct. 22, 2012, 43 pp.
Beckhaus et al., "LDP Downstream-on-Demand in Seamless MPLS," draft-ietf-mpls-ldp-dod-03, Network Working Group, Internet-Draft, Aug. 2, 2012, 34 pp.
"Network Scaling with BGP Labeled Unicast," Design and Configuration Guide, Juniper Networks, 2010, 22 pp.
Wrocklawski, "The Use of RSVP with IETF Integrated Services," Network Working Group, RFC 2210, Sep. 1997, 34 pp.
Rekhter, "Carrying Label Information in BGP-4," Network Working Group, RFC 3107, May 2001, 9 pp.

(Continued)

*Primary Examiner* — Melvin Marcelo
(74) *Attorney, Agent, or Firm* — Shumaker & Sieffert, P.A.

(57) ABSTRACT

An aggregation node establishes a first session using a traffic-engineering label distribution protocol. The first session has a next hop adjacent to the aggregation node and positioned within a same network as the aggregation node. The aggregation node also establishes a second session using a traffic-engineering label distribution protocol, wherein the second session has a remote next hop positioned at a border between the network and a second network. The aggregation node sends a message destined for the remote next hop over the second session for establishing an end-to-end traffic engineered label switched path for a FEC specified in a label request message received from an access node, wherein the message includes the same the data indicating constraint information that was received by the aggregation node in the label request message.

20 Claims, 6 Drawing Sheets

(56) References Cited

OTHER PUBLICATIONS

Andersson et al., "LDP Specification," Network Working Group, RFC 5036, Oct. 2007, 135 pp.

Decraene et al., "LDP Extension for Inter-Area Label Switched Paths (LSPs)," Network Working Group, RFC 5283, Jul. 2008, 12 pp.

U.S. Appl. No. 12/626,221, entitled "Scaling MPLS Across Areas of an Autonomous System Using Labeled Interior Border Gateway Protocol," filed Nov. 25, 2009.

U.S. Appl. No. 12/182,619, entitled "Streamlined Packet Forwarding Using Dynamic Filters for Routing and Security in a Shared Forwarding Plane," filed Jul. 30, 2008.

* cited by examiner

END-TO-END TRAFFIC ENGINEERING LABEL SWITCHED PATHS IN SEAMLESS MPLS

TECHNICAL FIELD

The disclosure relates to computer networks and, more particularly, to forwarding network traffic within a computer network.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

MPLS can be deployed in core and aggregation network and provides a mature and stable basis for large networks. MPLS can also be used in access networks, e.g. such as mobile or Digital Subscriber Line (DSL) backhaul networks. MPLS is used on two different layers: the Transport Layer and the Service Layer (e.g., for MPLS virtual private networks (VPNs)). In both cases, the protocols and the encapsulation are identical, but the use of MPLS is different especially concerning the signaling, the control plane, the provisioning, the scalability and the frequency of updates. On the service layer, only service specific information is exchanged, and every service can potentially deploy its own architecture and individual protocols. The services run on top of the transport layer.

A Seamless MPLS network is a network in which all forwarding of packets within the network, from the time a packet enters the network until it leaves the network, is done based on MPLS. The motivation of Seamless MPLS is to provide an architecture which supports a wide variety of different services on a single MPLS platform fully integrating access, aggregation and core network. The architecture can be used for residential services, mobile backhaul, business services and supports fast reroute, redundancy and load balancing. Seamless MPLS provides the deployment of service creation points which can be virtually everywhere in the network, enabling network and service providers with a flexible service and service creation. Service creation can be done based on the existing requirements without the needs for dedicated service creation areas on fixed locations. With the flexibility of Seamless MPLS, the service creation can be done anywhere in the network and easily moved between different locations.

SUMMARY

In general, this disclosure is directed to techniques for providing a mechanism to signal and establish an end-to-end traffic-engineered (TE) label switched path (LSP) across multiple regions (e.g., areas or autonomous systems), i.e., an inter-region TE LSP. For example, the techniques may be used by an access node to initiate establishment of the end-to-end inter-region traffic-engineered LSP between the access node and a remote access node, or between the access node and a remote service node.

In accordance with one example of the techniques of this disclosure, a non-TE enabled label distribution protocol used by an access node is extended to include, in a label request message, data specifying traffic engineering specifications for the end-to-end inter-region LSP to be established to the access node. The aggregation node that receives the label request message in response forwards the traffic engineering specifications, obtained from the received label request message, to a border node using a TE-enabled label distribution protocol, such as via an Resource Reservation Protocol with Traffic Engineering extensions (RSVP-TE) path message. The aggregation node generates an RSVP-TE path message that includes data indicative of the traffic engineering constraint information specified by the label request message received from the access node.

In one example, a network system includes an aggregation node that establishes a first session using a traffic-engineering label distribution protocol. The first session has a next hop adjacent to the aggregation node and positioned within a same network as the aggregation node. The aggregation node also establishes a second session using a traffic-engineering label distribution protocol, wherein the second session has a remote next hop positioned at a border between the network and a second network. The aggregation node sends a message destined for the remote next hop over the second session for establishing an end-to-end traffic engineered label switched path for a FEC specified in a label request message received from an access node, wherein the message includes the same sender traffic specification object that was received by the aggregation node in the label request message.

The techniques of this disclosure may provide one or more advantages. For example, the techniques of this disclosure provide mechanisms for establishing an end-to-end TE LSP across multiple different regions (e.g., areas or autonomous systems) without requiring the use of the same label distribution protocol in all of the regions, and without relying on use of a Border Gateway Protocol (BGP) as a label distribution protocol. In addition, the techniques of this disclosure provide a new mechanism driven by a LDP Downstream on Demand (DoD) label request message sent by the head-end router of the end-to-end inter-region traffic-engineered LSP to set up the end-to-end inter-region traffic-engineered LSP. A newly-defined FEC described herein supports new LSP instances that can be signaled in a make-before-break fashion.

In Seamless MPLS, head-end routers (i.e., access nodes) are normally low-end and low-performance devices running simple access-IGP or static-routing and LDP DoD, and are not running IGP-TE and RSVP-TE. Thus, access nodes of such networks typically do not have the capability of TE path computation. The techniques of this disclosure may fit well in the Seamless MPLS architecture, with little to no impact on existing scalability or functionality, while adding a lightweight mechanism for the low-end access node to initiate end-to-end TE path formation without requiring the control plane of the access node to run an Interior Gateway Protocol for TE (IGP-TE) and RSVP-TE. Seamless MPLS is described in further detail at N. Leymann, "Seamless MPLS Architecture," draft-ietf-mpls-seamless-mpls-02, Internet-Draft, MPLS Working Group, October 2012, the entire content of which is incorporated by reference herein.

In one example aspect, a method includes receiving, by an aggregation node, a label request message generated by an access node, wherein the label request message specifies a forwarding equivalence class (FEC) for traffic to be sent by the access node, and data that indicates constraint information for the traffic to be sent by the access node, and, by the aggregation node, establishing a first session for a traffic-engineering label distribution protocol with a next hop adjacent to the aggregation node and positioned within a same network as the aggregation node. The method further includes by the aggregation node, establishing a second session for the same traffic-engineering label distribution protocol, wherein the second session has a remote next hop positioned at a border between the network and a second network, and sending a message destined for the remote next hop over the second session for establishing an end-to-end traffic engineered label switched path for the FEC specified in the label request message, wherein the message includes the data indicating the constraint information, which was received by the aggregation node in the label request message from the access node.

In another example aspect, a network device includes a physical interface to receive a label request message generated by an access node, wherein the label request message specifies a forwarding equivalence class (FEC) for traffic to be sent by the access node, and data that indicates constraint information for the traffic to be sent by the access node, and a control unit to establish a first session for a traffic-engineering label distribution protocol with a next hop adjacent to the network device and positioned within a same network as the network device, and to establish a second session for the same traffic-engineering label distribution protocol, wherein the second session has a remote next hop positioned at a border between the network and a second network. The network device also includes a traffic-engineering label distribution protocol module to generate a message destined for the remote next hop over the second session for establishing an end-to-end traffic engineered label switched path for the FEC specified in the label request message, wherein the message includes the data indicating the constraint information, which was received by the network device in the label request message from the access node; and a forwarding component to send the message over the second session.

In a further example aspect, a computer-readable storage medium includes instructions for causing a programmable processor to receive a Label Distribution Protocol (LDP) Downstream on Demand (DoD) label request message generated by an access node, wherein the LDP DoD label request message specifies a forwarding equivalence class (FEC) for traffic to be sent by the access node, and data that indicates constraint information for the traffic to be sent by the access node, and establish a first session for Resource Reservation Protocol with Traffic Engineering extensions (RSVP-TE) with a next hop adjacent to an aggregation node and positioned within a same network as the aggregation node. The computer-readable storage medium further includes instructions for causing the programmable processor to establish a second session for RSVP-TE, wherein the second session has a remote next hop positioned at a border between the network and a second network, and, responsive to receiving the label request message and by the aggregation node, look up the FEC specified by the LDP DoD label request message in BGP labeled unicast (BGP-LU) routing information stored by the aggregation node. The computer-readable storage medium further includes instructions for causing the programmable processor to determine the remote next hop comprising a BGP next hop to which to send the message to reach the FEC based on the lookup in the BGP-LU routing information, and send a message destined for the BGP next hop over the second session for establishing an end-to-end traffic engineered label switched path for the FEC specified in the label request message, wherein the message includes the data indicating the constraint information, which was received by the aggregation node in the LDP DoD label request message from the access node.

The details of one or more examples are set forth in the accompanying drawings and the description below. Other features, objects, and advantages will be apparent from the description and drawings, and from the claims.

DETAILED DESCRIPTION

Figure 1:
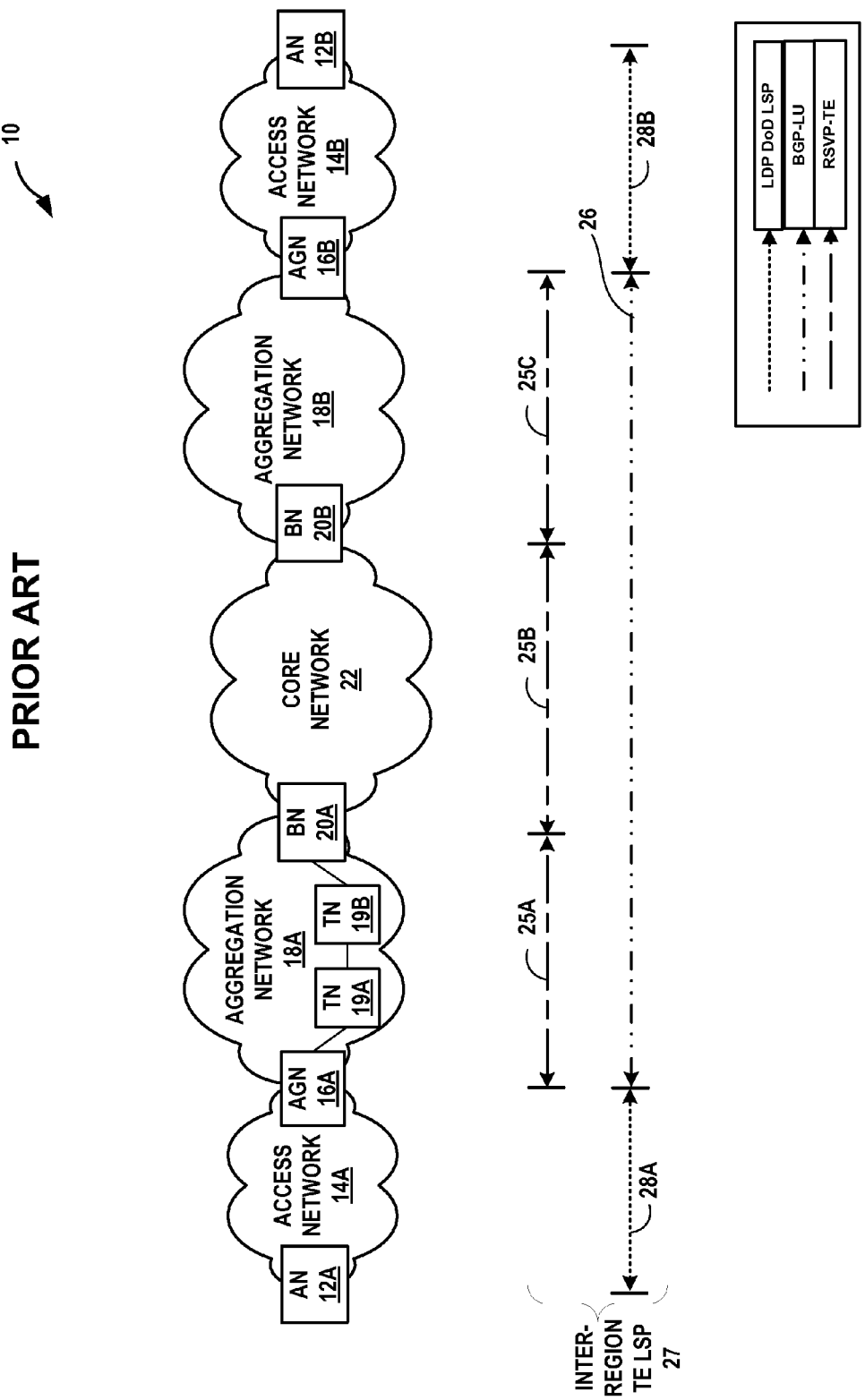
FIG. 1 is a block diagram illustrating an example network system in which techniques described herein may be implemented.

FIG. 1 is a block diagram illustrating an example system 10 in which conventional techniques are used to establish an inter-region LSP 27. In particular, system 10 utilizes the Label Distribution Protocol (LDP) within access networks 12 and RSVP-TE within aggregation networks 18 and core network 22. Border Gateway Protocol Labeled Unicast (BGP-LU) is utilized in conjunction with LDP to establish an inter-region LSP 27. As explained herein, due to the limitations of these conventional techniques employed by system 10, inter-region LSP 27 is unable to enforce traffic engineered constraints from end-to-end, i.e., from access node 12A to access node 12B.

There are several types of nodes in the system 10 of FIG. 1. Access Nodes (ANs) 12A-12B ("access nodes 12") are nodes which process customer frames or packets at layer two or above. In some examples, ANs 12 may include Digital Subscriber Line Access Multiplexers (DSLAMs), multi-tenant units (MTUs), Passive Optical Network (PON) termination devices, optical line terminals (OLTs), and cell site gateways (CSGs). ANs 12 have only limited MPLS functionalities in order to reduce complexity in the access networks 14A-14B ("access networks 14"). ANs 12 are the first (and last) nodes that process customer packets at Layer 2 or higher.

ANs 12 may be connected to one or more end nodes (ENs) positioned "outside" system 10, which each represent a network customer, from individual subscriber devices to data center servers. For example, an end node may be a business or residential end-user, or a server providing services such as voice services, video services, content, cloud services, and so on. For example, ANs 12 may provide network access to subscriber devices (not shown), such as, for example, personal computers, laptop computers or other types of computing device associated with subscribers. Subscriber devices may comprise, for example, mobile telephones, laptop or desktop computers having, e.g., a 3G wireless card, wireless-capable netbooks, video game devices, pagers, smart phones, personal data assistants (PDAs) or the like. Each of the subscriber devices may run a variety of software applications, such as word processing and other office support software, web browsing software, software to support voice calls, video games, videoconferencing, and email, among others.

With respect to multi-protocol label switching (MPLS) functionality, ANs 12 of access networks 14 are typically kept simple in that the access nodes may execute label distribution and path computation protocols of low complexity, such as protocols that typically do not accommodate traffic engineered (TE) paths. Compared to Aggregation Nodes 16 and/or devices of core network 22, a typical access node 12 is less powerful. To reduce the complexity and the costs of an access node, less than the full MPLS functionality is supported (control and data plane functionality) within ANs 12. For example, ANs 12 may not execute an IGP, and instead, static routing should be sufficient. In some case, more complex functionality may be moved out of the access node to reach a high-level of scalability. Thus, although only a single AN 12 is shown in FIG. 1 for each of ANs 14, in fact the number of access nodes can be very high.

Aggregation Nodes (AGNs) 16A-16B ("aggregation nodes 16") are nodes which aggregate several access nodes (ANs). AGNs 16 operate at an edge of a respective aggregation network 18A or 18B ("aggregation networks 18"). In some examples, access nodes are single attached on one aggregation node using static routing entries on the AN and AGN. In other examples, ANs may are dual attached on two different AGN using static routes. Although illustrated for purposes of example in FIG. 1 as having only a single access node 12 at each of access networks 14A, 14B, in some examples access networks 14 and AGNs 16 may be associated with one or more additional access nodes (not shown). In Seamless MPLS, AGNs 16 may act as an access ABR connecting access and metro domains.

Aggregation networks 18 operate to aggregate traffic from respective access nodes 12. The aggregation nodes 16 have functionalities that enlarge the scalability of the simple access nodes 12 that are connected. The IGP of aggregation nodes 16 will be link state based. Each aggregation area must be a separated IGP area. All routes that are inter-area should use an Exterior Gateway Protocol (EGP) to keep the IGP small. The aggregation nodes 16 have full scalability concerning control plane and forwarding.

Aggregation network 18 provides transport services for network traffic associated with subscribers 18. Aggregation network 18 typically includes one or more aggregation nodes ("AG") 16, such as internal routers and switches that provide transport services between Border nodes (BNs) 20A-20B ("border nodes 20") and ANs 12. Although not shown, aggregation network may include other devices to provide security services, load balancing, billing, deep-packet inspection (DPI), and other services for mobile traffic traversing aggregation network 18.

Border nodes 20A-20B ("border nodes 20"), also referred to as Area Border Routers (ABRs) are routers positioned between aggregation and core domains, such as between an aggregation network 18 and core network 22. In some aspects, border nodes ("BNs") 20 store no customer or service state and are decoupled from service creation. BNs 20 are transport nodes that interconnect two or more regions.

Core network 22 connects aggregation networks 18. Network devices of core network 22 typically have the full scalability concerning control plane and forwarding. The Interior Gateway Protocol (IGP) is link state based. The core area typically does not include routes from aggregation areas. All routes that are inter-area should use an Exterior Gateway Protocol (EGP) to keep the IGP state small.

ANs 12, AGNs 16, and BNs are connected to one another through links (not shown) and possibly through intermediate devices (not shown in each of networks 14, 18, 22). The links may be any type of computer network transmission medium. For instance, a link in network 14A may be a fiber optic cable, an Ethernet cable, a wireless connection, and so on. In the example of FIG. 1, aggregation network 18A is shown as including transit nodes (TNs) 19A-19B ("TNs 19") that are intermediate nodes between AGN 16A and BN 20A. Although illustrated for purposes of example as including two transit nodes 19, aggregation network 18A may include other TNs that are not shown. Similarly, each of networks 14, 18, and 22 may likewise include one or more TNs (not shown).

A traffic-engineering label distribution protocol, such as RSVP-TE, is used within the interior of aggregation network 18A to establish an intra-region RSVP-TE LSP 25A between AGN 16A and BN 20A. For example, adjacent ones of AGN 16A, transit node 19A, transit node 19B, and BN 20A may establish RSVP sessions with each other for communicating RSVP RESV and PATH messages to establish RSVP-TE LSP 25A within aggregation network 18A. In this example, AGN 16A has a physical next hop of TN 19A along RSVP-TE LSP 25A, where the next hop TN 19A is adjacent to AGN 16A and positioned within a same network 18A as AGN 16A. Intra-region RSVP-TE LSP 25A may be established by AGN 16A sending an RSVP-TE PATH message having an explicit route object (ERO) that specifies a path "AGN 16A-TN 19A-TN 19B-BN 20A." More specifically, the ERO may include sub-objects consisting of Internet Protocol (IP) addresses associated with interface ports of the network devices on the selected path. Similarly, RSVP-TE LSPs 25B and 25C each represent respective RSVP-TE LSPs that are intra-region LSPs.

As shown in the conventional system of FIG. 1 AGNs 16 and BNs 20 execute the BGP protocol to form an inter-region Border Gateway Protocol Labeled Unicast (BGP-LU) LSP 26 between AGNs 16A and 16B. AGNs 16 and BNs 20 utilize BGP sessions between BGP next hops to exchange BGP labels and construct an inter-region LSP 26. AGN 16A, BN 20A, BN 20B and AGN 16B are referred to as "protocol next hops" with respect to each other along BGP-LU LSP 26 in that, although not physical next hops, the routers are next hops with respect to peers of a protocol, such as the BGP protocol. That is, as one example, there are no intermediate BGP-enabled routers (or "BGP peers") between AGN 16A and BN 20A and, therefore, AGN 16A and BN 20A are next hops along any inter-region BGP-LU LSP 26 established by the routers using BGP even though the routers are remote from each other and not adjacent. Similarly, BNs 20A, 20B communicate via a BGP session and may be viewed a protocol next hops with respect to BGP, and the same is true for BN 20B and AN 16B.

In this way, the conventional multi-region network 10 makes use of BGP-LU to establish an inter-region LSP 26 to enable inter-region end-to-end routing, as it provides the communication and connectivity between multiple regions. BGP-LU enables BGP to advertise unicast routes with an MPLS label binding (a prefix and label). To accomplish this, BGP-LU leverages Multiprotocol Border Gateway Protocol (MP-BGP) and subsequent address family identifier (SAFI) 4 which indicates that the network layer reachability information (NLRI) contains a label mapping. BGP-LU is the label signaling and routing protocol that provides the PE-to-PE reachability between remote AGNs. That is, the AGNs and the BNs may establish the BGP-LU LSP by using the BGP protocol as a label distribution protocol. The "hops" of the BGP-LU LSP do not need to be adjacent, just like two neighbors that form a unicast internal BGP (IBGP) session do not need to be adjacent. Rather, as explained above, the "next hops" of BGP-LU LSP are those routers that participate in BGP-LU and are protocol next hops in the forwarding path of the LSP.

In the conventional system 10 of FIG. 1, ANs 12A and 12B use the Label Distribution Protocol (LDP) as a lightweight, non-traffic engineering MPLS protocol. In order to keep the control plane of AN 12A lightweight, and to avoid the necessity for AN 12A to store thousands of MPLS label bindings for each upstream AGN peer, AN 12A may use LDP in downstream-on-demand (DoD) mode. In this mode the upstream LSR (e.g., AN 12A) will explicitly ask the downstream LSR (e.g., AGN 16A) for a label binding for a particular FEC when needed, such as by sending a label request message. However, conventionally, an LDP label request does not carry any traffic engineering information. LDP downstream-on-demand mode is specified in "LDP Specification," RFC 5036, October 2007, the entire contents of which are incorporated by reference herein. See also T. Beckhaus, "LDP Downstream-on-Demand in Seamless MPLS," draft-ietf-mpls-ldp-dod-03, Internet-Draft, Network Working Group, August 2012, the entire content of which is incorporated by reference herein.

Figure 2:
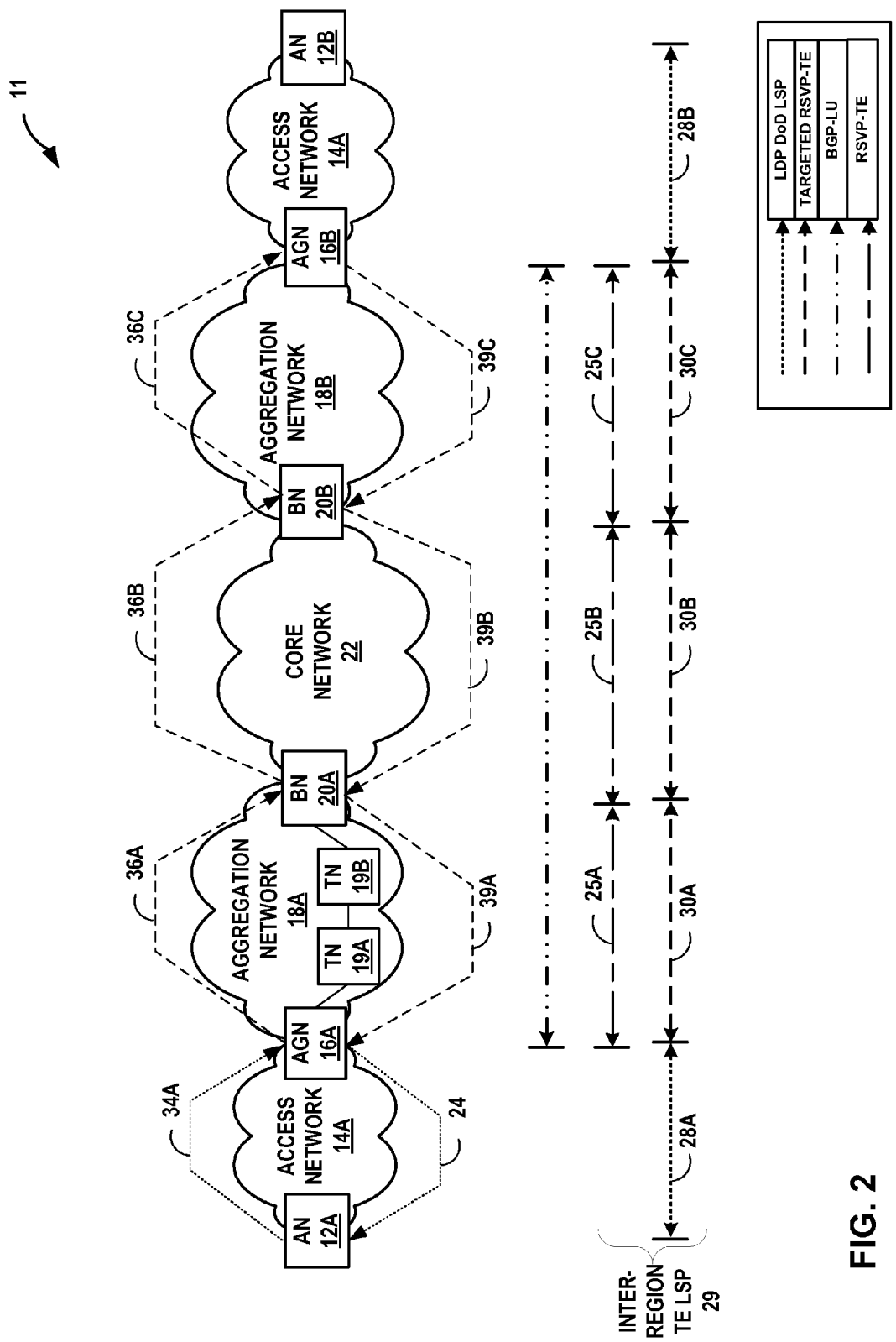
FIG. 2 is a block diagram illustrating an example network system in which techniques described herein may be implemented.

FIG. 2 is a block diagram illustrating in further detail an example implementation in which the elements of network system 10 implement the techniques described herein to establish an end-to-end traffic-engineered inter-region traffic-engineered LSP 29 from AN 12A to AN 12B. That is, LSP 29 has been traffic engineered, and satisfies specified traffic-engineering constraints, across all of regions 14A, 18A, 22, 18B and 14B, even though access networks 14 typically utilize a non-TE enabled label distribution protocol. As used herein, the term "region" includes autonomous systems and areas. Inter-region TE LSP 29 includes several LSP segments, including LDP LSP 28A, targeted RSVP-TE LSP 30A, targeted RSVP-TE LSP 30B, targeted RSVP-TE LSP 30C, and LDP LSP 28B.

Although access networks 14 typically utilize a non-TE enabled label distribution protocol such as LDP, the techniques described herein may be applied to establish an end-to-end traffic engineered inter-region LSP 29 that extends across all of regions 14A, 18A, 22, 18B and 14B. As explained in further detail below, AN 12A and AGN 16A may execute an extended LDP protocol described herein that includes the ability to specify traffic engineering (TE) constraint information. Moreover, instead of forming an inter-region BGP-LU LSP between AGNs 16A and 16B, as with conventional BGP LU, AGNs 16 and BNs 20 may dynamically establish and utilize a series of targeted RSVP-TE sessions between BGP next hops to construct inner RSVP LSP segments 30A, 30B and 30C. More specifically, AGNs 16 and BNs 20 execute the BGP protocol as described above to exchange routes and optionally even BGP labels that would typically be used to form an inter-region Border Gateway Protocol Labeled Unicast (BGP-LU) LSP 26, as illustrated in FIG. 1. However, instead of using the BGP labels for establishing the, AGNs 16A and 16B, AGNs 16 and BNs 20 utilize a series of targeted RSVP-TE sessions between the BGP next hops to construct inner RSVP LSP segments 30A, 30B and 30C of inter-region TE LSP 29. Thus, although BGP-LU state is stored by AGNs 16 and BNs 20, AGNs 16 and BNs 20 disregard the BGP labels when establishing inter-region TE LSP 29, instead using targeted RSVP sessions to construct segment RSVP LSPs 30 of inter-region TE LSP 29. The use of the extend LDP protocol within access networks 14 and the targeted RSVP sessions allow for an end-to-end TE LSP 29 to be established that is capable of enforcing TE constraints, thus providing an end-to-end solution for Seamless MPLS.

End-to-end solutions such as Seamless MPLS, an architecture which integrates access, aggregation and core network in a single MPLS domain, allow for establishing end-to-end inter-region LSP between AN 12A and AN 12B. However, as explained in reference to FIG. 1, these solutions conventionally do not provide any mechanism to enable automatically establishing an end-to-end traffic engineering between AN 12A and AN 12B. For example, when one of AGNs 16 or BNs 20 select an RSVP-TE LSP segment to use for tunneling traffic sent on the end-to-end inter-region traffic-engineered LSP 29, the AGNs 16 or BNs 20 generally have not received any information by which to consider traffic engineering constraints in making this selection.

In accordance with one example implementation of the techniques of this disclosure, ANs 12, AGNs 16, and BNs 20 are configured such that they can automatically establish an end-to-end inter-region traffic-engineered LSP 29. The term "automatically" establishing refers to the end-to-end inter-region traffic-engineered LSP 29 being established by the network devices by way of exchanging signaling messages, and without requiring any user intervention beyond initial configuration of AN 12A.

In the MPLS architecture, network traffic flows from an upstream LSR to a downstream LSR. For example, if network traffic is flowing from AN 12A to AGN 16A, for example, then AN 12A is the upstream LSR and AGN 16A is the downstream LSR in this context. Some examples described herein the downstream assignment of labels, where labels are assigned by the downstream LSR and signaled to the upstream LSR.

LDP is one example of a non-traffic-engineering label distribution protocol used for MPLS label distribution between AGN 16A and AN 12A and by any other LSRs (not shown) within access network 14A. In order to keep the control plane of AN 12A lightweight, and to avoid the necessity for AN 12A to store thousands of MPLS label bindings for each upstream AGN peer, AN 12A may use LDP in downstream-on-demand (DoD) mode, described in further detail below. In this mode the upstream LSR (e.g., AN 12A) will explicitly ask the downstream LSR (e.g., AGN 16A) for a label binding for a particular FEC when needed, such as by sending a label request message.

In accordance with the techniques of this disclosure, a non-traffic-engineering label distribution protocol, such as LDP, executing on AN 12A is extended to include the ability to initiate formation of an end-to-end inter-area TE LSP by sending a label request message that includes traffic engineering constraint information specifying TE requirements for the end-to-end inter-region LSP to be established to AN 12B. In this manner, AN 12A and AGN 16A execute an extended LDP protocol that includes a DoD mode that supports two LSP request modes, i.e., TE and non-TE (best-effort) modes. AGN 16B and AN 12B can similarly communicate using LDP DoD.

Responsive to receiving the LDP DoD message specifying TE constraint information, AGN 16A in turn identifies the BGP next hop to the desired destination (AN 12B being the destination in this example) based on BGP routes that AGN 16A has learned via BGP route advertisements. In this example, AGN 16A identifies BN 20A as the BGP next hop. However, instead of using BGP as a label distribution protocol with the BGP next hop, AGN 16A proceeds to establish a targeted RSVP control plane communication session with the identified BGP next hop, BN 20A in this example. AGN 16A then generates an RSVP-TE PATH message to be sent to BN 20A on the targeted RSVP-TE session between AGN 16A and BN 20A to establish LSP 30A. A "targeted" RSVP-TE session is a communication session between two specific RSVP-enabled routers even though the routers need not be physical next hops or even protocol next hops with respect to RSVP. For example, AGN 16A establishes a "targeted" RSVP session with BN 20A to bypass intermediate RSVP-enabled transit nodes 19A, 19B. As such, RSVP-enabled TNs 19A, 19B are not involved in the signaling of RSVP-TE LSP 30A. Moreover, AGN 16A signals and establishes RVSP-TE LSP 30A based on the constraint information contained within the received label request message. That is, the RSVP-TE PATH message may include data indicative of the traffic engineering constraint information specified by the label request message (e.g., LDP DoD message) received from AN 12A. AGN 16A communicates the RVSP-TE PATH message directly to BN 20A via the targeted RSVP-TE session, such bypassing TNs 19A, 19B from participation in RSVP-TE LSP 30A.

Example signaling is described with respect to FIG. 2. In this example, AN 12A outputs an LDP DoD Label Request message 34A (FIG. 2) that includes a FEC and a new TE TLV that specifies bandwidth or other TE constraints, for example. The FEC included in the label request message may be an IPv4 or an IPv6 FEC, such as an address of the access node to which an end-to-end traffic engineering LSP is desired to be established, e.g., an IP address of AN 12B of FIG. 1. In other examples, the FEC may be a new TE FEC that specifies information such as <source, destination, tunnel ID, extended tunnel ID, LSP ID> which is similar to an RSVP LSP FEC. AN 12A may be configured with the FEC information. The TE TLV may be a bandwidth TLV of the LDP DoD message, and may include a Sender T_Spec object that specifies the bandwidth required of each segment of an end-to-end inter-area TE LSP to be established between AN 12A and AN 12B.

The tunnel ID becomes relevant when a multi-path tunnel is being established, with multiple LSP instances within the tunnel container. In this case, the multiple LSPs would be established having different LSP IDs but a common tunnel ID. This may be used by AN 12A to, for example, subsequently increase the bandwidth capacity of an end-to-end inter-region tunnel by creating a second LSP ID for that tunnel, which may follow a different path than the LSP associated with the first LSP ID.

In addition to any prior conventional RSVP session that AGN 16A may already have with TN 19A for establishing intra-region LSP 25A within aggregation network 18A, AGN 16A establishes an additional (second) targeted session to communicate with BN 20A, i.e., the identified BGP next hop. AGN 16A utilizes the second RSVP-TE session to establish LSP 30A using the same traffic-engineering label distribution protocol, such as RSVP-TE, as was used to establish LSP 25A from AGN 16A to BN 20A. As such, RSVP-TE LSP 30A from AGN 16A has a remote next hop of BN 20A, where the next hop BN 20A is remote from AGN 16A and positioned at a border between network 18A and core network 22. RSVP-TE LSP 30A may be established by AGN 16A sending an RSVP-TE PATH message having an explicit route object (ERO) that specifies a path "AGN 16A-BN 20A" on the targeted RSVP session In this way, RSVP-TE LSP 25A from AGN 16A to BN 20A is a hop-by-hop RSVP LSP, with AGN 16A as its ingress (head-end) router and BN 20A as its egress (tail-end) router and TNs 19A, 19B participating in the RSVP LSP. The second RSVP-TE LSP 30A between AGN 16A and BN 20A is formed by a targeted RSVP session, and is an inner RSVP-TE LSP with AGN 16A as its ingress router and BN 20A as its egress router and of which TNs 19A, 19B are unaware. In some examples, the second RSVP-TE LSP 30A may be established to run over the first RSVP-TE LSP 25A, such that packets sent over the second RSVP-TE LSP have a two-label stack with an outer label associated with the first RSVP-TE LSP and an inner label associated with the second RSVP-TE LSP. More details on RSVP-TE may be found at See J. Wroclawski, "The Use of RSVP with IETF Integrated Services," RFC 2210, Network Working Group, September 1997, the entire content of which is incorporated by reference herein.

In some examples, AGN 16A establishes the targeted RSVP-TE LSP responsive to receiving the LDP DoD message with the Sender T_Spec object, if AGN 16A determines that a targeted RSVP-TE LSP does not exist to the BGP-LU next hop to the FEC specified by the LDP DoD message.

When AGN 16A receives the LDP Label Request from AN 12A, AGN 16A identifies a next region border node based on BGP next-hop for the LSP's destination, as specified in the FEC TLV of the LDP label request message. For example, AGN 16A does a lookup in stored BGP routing information using the FEC as a key to identify the BGP-LU next-hop for AN 12B. In this example, the identified BGP-LU next hop is BN 20A. AGN 16A then signals (or selects, if one exists already) an intra-region RSVP-TE LSP in the next region to BN 20A, and propagates the SENDER_TSPEC to the downstream region border node via a Path message 36A of the targeted RSVP session to BN 20A. BN 20A in turn signals (or selects) an intra-region RSVP-TE LSP 25B in the next region based on the SENDER_TSPEC, and propagates the SENDER_TSPEC further to the next region border node (e.g., BN 20B) via a Path message 36B of the targeted RSVP session.

BN 20B in turn signals (or selects) an intra-region RSVP-TE LSP 25C in the next region based on the SENDER_TSPEC, and propagates the SENDER_TSPEC further to the next region border node (e.g., AGN 16B) via a Path message 36C of the targeted RSVP session. When the Path message reaches the remote aggregation node or service node (here, AGN 16B), the node terminates RSVP signaling and allocates a label for the LSP. If the node is an aggregation node, this means the LSP's destination is an access node local to the aggregation node (e.g., AN 12B local to AGN 16B). AGN 16B binds the label with a "label swap" to an LDP label to AN 12B and stores the label binding in forwarding information, and then distributes the label upstream to the previous region border node (BN 20B) via a Resv message 39C of the targeted RSVP session.

At each upstream region border node, a label is allocated, bound to a "label swap" to the received RSVP label and a "label push" with the label of the intra-region TE LSP in the downstream region, and then distributed upstream to the previous region border node via a Resv message 39B of the targeted RSVP session. When the RSVP Resv message 39A reaches the aggregation node local to the LSP head-end (in this example, AGN 16A local to AN 12A), the aggregation node allocates a label, binds it to a "label swap" to the received RSVP label and a "label push" with the label of the intra-region TE LSP in the downstream region, and then distributes the allocated label to the head-end via LDP Label Mapping message 24. In this manner, the downstream ABR 16A will respond to the upstream AN 12A with label mapping message 24 with a non-null label allocated by ABR 16A if ABR 16A is able to confirm a bandwidth reservation has succeeded along a path toward the destination FEC that meets the TE constraints specified in the LDP DoD label request message 34A. At this point, end-to-end inter-region TE LSP 29 has been established.

Inter-region TE LSP 29 may, once established, carry L3 multicast traffic, such as Internet Protocol Television (IPTV), desktop conferences, corporate broadcasts, music and video web casts, and other forms of multimedia content, from a source coupled to AN 12A, to subscriber devices (not shown) connected to AN 12B, or vice versa. ANs 12 may be coupled to a plurality of subscriber devices, such as desktop computers, laptops, workstations, PDAs, wireless devices, network-ready appliances, file servers, print servers or other devices.

An inter-region TE LSP from a service node (not shown) to an access node can be set up in the same fashion as above. In this case, the signaling is still triggered by LDP DoD Label Request message sent by AN 12A. The difference is that the destination is a service node, rather than an AN. A service node is used to create services for customers and is connected to one or more transport nodes, such as TNs 19 of FIGS. 1-2. Typical examples of service nodes include Broadband Network Gateways (BNGs), video servers. These nodes apply services to customer packets. Examples include L2PEs, L3PEs, Broadband Network Gateways (BNGs), peering routers, video servers, base station controllers, and media gateways.

In some examples, a single physical device may play multiple roles. For example, an AN 12 may also be a SN—or, a SN may double as a TN. SHs may be embedded in SNs. It is often useful to "virtualize" a physical device that plays multiple roles (using the notion of logical routers) so as to minimize the impact of one role on another, both from a control plane and a management point of view.

In contrast to other approaches, the techniques of this disclosure allow for establishing an end-to-end TE LSP across multiple different regions (e.g., areas or autonomous systems) without requiring the use of the same label distribution protocol in all of the regions, and without relying on BGP as a label distribution protocol. A different approach that uses labeled interior border gateway protocol is described in application Ser. No. 12/626,221, filed Nov. 25, 2009, entitled "SCALING MPLS ACROSS AREAS OF AN AUTONOMOUS SYSTEM USING LABELED INTERIOR BORDER GATEWAY PROTOCOL," the entire content of which is incorporated by reference herein.

Figure 3:
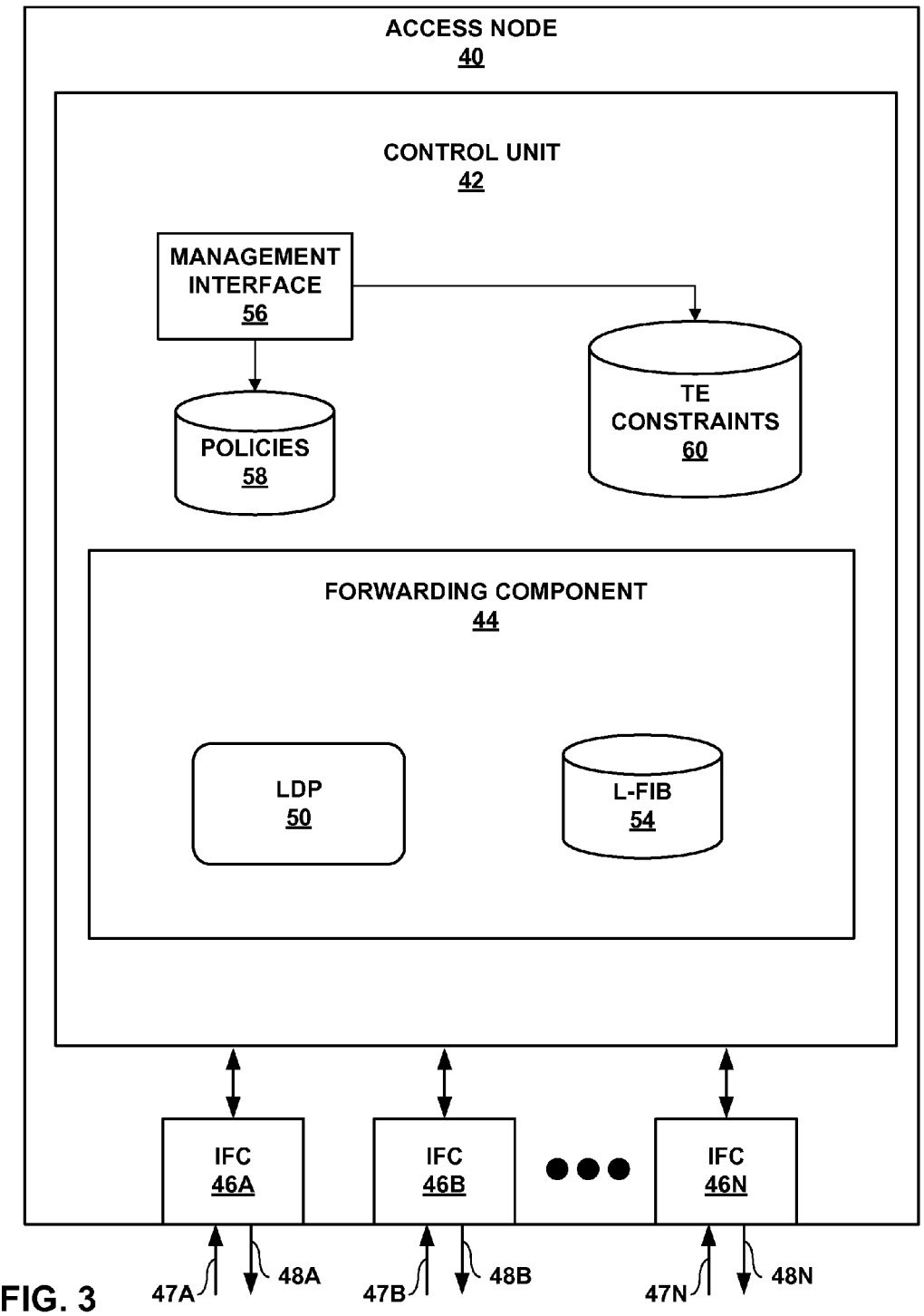
FIG. 3 is a block diagram illustrating an exemplary access node network device in accordance with the disclosure herein.

FIG. 3 is a block diagram illustrating an example an exemplary access node 40 in accordance with this disclosure. Access node 40 may, for example, represent any of access nodes 12 of FIGS. 1-2. In this example, access node 40 includes a control unit 42 that comprises a forwarding component 44. In addition, access node 40 includes a set of interface cards (IFCs) 46A-46N (collectively, "IFCs 46") for communicating packets via inbound links 47A-47N (collectively, "inbound links 47") and outbound links 48A-48N (collectively, "outbound links 48").

LDP is used for MPLS label distribution between AGN and AN. LDP module 50 is deployed in downstream-on-demand (DoD) mode, described below. To allow the label bindings received via LDP DoD to be installed into the LFIB on the AN without having the specific host route to the destination loopback address, but only a default route, use of the LDP Extension for Inter-Area Label Switched Paths, as described in RFC 5283, may be made. See B. Decraene, "LDP Extension for Inter-Area Label Switched Paths (LSPs)," Network Working Group, RFC 5283, 2008, the entire contents of which is incorporated by reference herein.

In the DoD mode the upstream LSR (access node 40) will explicitly ask the downstream LSR (e.g., an AGN) for a label binding for a particular FEC when needed. LDP module 50 sends a LDP DoD label request message to the downstream AGN. The assumption is that a given AN will only have a limited number of services configured to an even more limited number of destinations, or egress LER. Instead of learning and storing all label bindings for all possible loopback addresses within the entire Seamless MPLS network, the AN will use LDP DoD to only request the label bindings for the FECs corresponding to the loopback addresses of those egress nodes to which it has services configured. LDP module 50 may subsequently receive a label mapping message from the downstream AGN that specifies a label binding for the FEC of the end-to-end inter-region TE LSP. LDP module 50 stores the label binding information to L-FIB 54.

An administrator can configure policies 58 and TE requirements 60 on access node 40 via management interface 56. Policies 58 may include service configuration information, for example. In some examples, rather than obtaining the FEC and bandwidth TLV from configured TE requirements 60, access node 40 may automatically derive the FEC and bandwidth TLV from service configuration. For example, control unit 42 may determine that service configuration indicates that access node 40 requires use of a pseudowire to a remote access node, where the pseudowire is of a certain bandwidth, and in response to the determination, control unit 42 invokes LDP module 50 to automatically initiate establishment of an end-to-end inter-region traffic-engineered LSP by sending an LDP DoD label request message that specifies the FEC of the remote access node and specifies a sender T_Spec object that indicates the bandwidth required.

LDP module 50 may, in other examples, request label bindings from adjacent downstream LSR/ABRs based on the following trigger events: (a) Access LSR/ABR is configured with /32 static route with LDP DoD label request policy; (b) Access LSR/ABR is configured with a service (mentioned above); (c) Configuration with access static routes-Access LSR/ABR link to adjacent node comes up and LDP DoD session is established. In this case access LSR may send label request messages for all /32 static routes configured with LDP DoD policy and all /32 routes related to provisioned services that are covered by default route; (d) Configuration with access IGP-Access LSR/ABR link to adjacent node comes up and LDP DoD session is established. In this case access LSR may send label request messages for all /32 routes learned over the access IGP and all /32 routes related to provisioned services that are covered by access IGP routes; (e) In all above cases requests are sent to next-hop LSR(s) and alternate LSR(s).

LDP module 50 of access node 40 may propose the Downstream-on-Demand label advertisement mode of LDP by setting "A" value to 1 in the Common Session Parameters TLV of the Initialization message. The rules for negotiating the label advertisement mode are specified in LDP protocol specification RFC5036. To establish a Downstream-on-Demand session between the two access nodes, both should propose the Downstream-on-Demand label advertisement mode in the Initialization message.

In the seamless MPLS context, access node 40 typically is a low-end, low-performance device with a simple control plane that does not support not running IGP-TE and RSVP-TE. Thus, typically the access node 40 does not have the capability of TE path computation. By extending LDP DoD as proposed herein, the techniques of this disclosure may fit well in the Seamless MPLS architecture, with little to no impact on existing scalability or functionality, while adding a mechanism for access node 40 to initiate end-to-end TE path formation.

Optionally, access node 40 could use an automatism that asks for a FEC for the LSR-ID. A configuration switch that disables this option must be implemented. The way of initiating the DoD-signaling of the label could be done with both methods (configuration/automatism). Access node 40 knows by configuration to which destination a pseudowire is set up. Access node 40 is always the endpoint of the pseudowire. Before signaling a pseudowire access node 40 will ask (via LDP DoD) the AGN for a FEC. Because of this an independent pre-configuration may not be necessary on the AN in some cases. The following are the triggers for ANs to request a label: When a control session (targeted LDP) to a target has to be established; or when a service label has been received by a control session (e.g. pseudo wire label).

In one embodiment, control unit 42 and forwarding component 44 may comprise one or more dedicated processors, hardware, and/or computer-readable media storing instructions to perform the techniques described herein. Forwarding component 44 and IFCs 46 may be coupled by switch fabric. The architecture of access node 40 illustrated in FIG. 3 is shown for exemplary purposes only. In other embodiments, access node 40 may be configured in a variety of ways. In one embodiment, for example, control unit 42 and its corresponding functionality may be distributed within IFCs 46.

Control unit 42 may be implemented solely in software, or hardware, or may be implemented as a combination of software, hardware, or firmware. For example, control unit 42 may include one or more processors which execute software instructions. In that case, the various software modules of control unit 42 may comprise executable instructions stored on a computer-readable medium, such as computer memory or hard disk.

Figure 5:
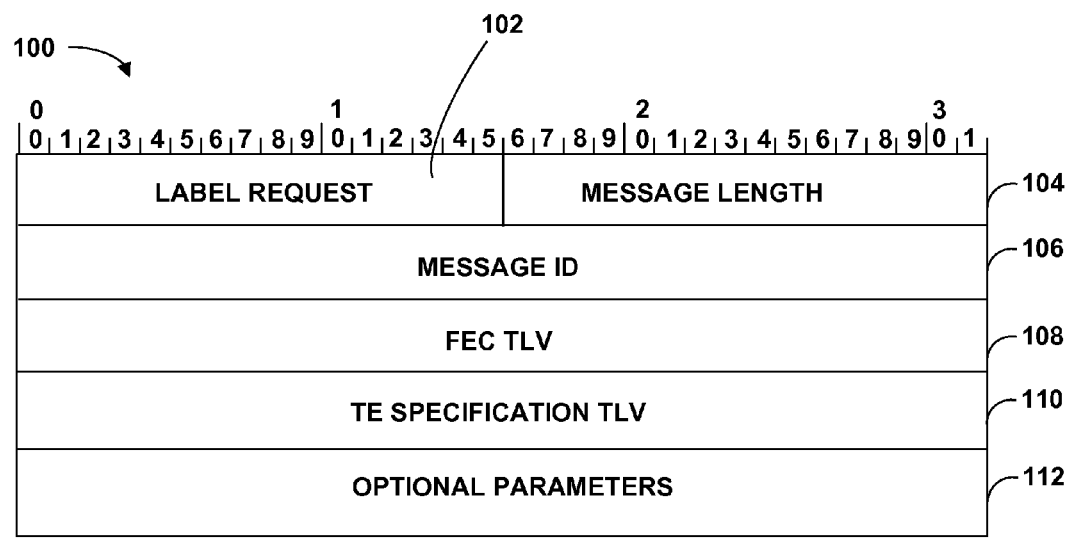
FIG. 5 is an example illustration of an example packet format that may be used in accordance with the techniques described herein.

FIG. 5 is a block diagram illustrating an example an exemplary aggregation node 70 in accordance with this disclosure. Aggregation node 70 may, for example, represent any of aggregation nodes 16 of FIG. 1. In this example, aggregation node 70 includes a control unit 72 that comprises a routing component 74 and a forwarding component 75. In addition, aggregation node 70 includes a set of interface cards (IFCs) 76A-576N (collectively, "IFCs 76") for communicating packets via inbound links 77A-77N (collectively, "inbound links 77") and outbound links 78A-78N (collectively, "outbound links 78").

Routing component 74 primarily provides an operating environment for control plane protocols. For example, one or more protocols 80 maintain routing information 82 to reflect the current topology of a network and other network entities to which it is connected. In particular, certain of protocols 80 update routing information 82 to accurately reflect the topology of the network and other entities. Example routing protocols include Border Gateway Protocol (BGP), including interior BGP (iBGP) 80E and exterior BGP (eBGP) 80F, and BGP labeled unicast (BGP-LU) 80G, the Intermediate System to Intermediate System (ISIS) routing protocol (IS-IS 80C), and the Open Shortest Path First (OSPF) routing protocol (OSPF 80D), among others.

Routing component 74 generates and programs forwarding component 75 with forwarding information base (FIB) 84 that associates network destinations with specific next hops and corresponding interfaces ports of IFCs 76 in accordance with routing information 82. Routing component 74 may generate FIB 84 in the form of a radix tree having leaf nodes that represent destinations within the network, for example.

Based on FIB 84, forwarding component 75 forwards packets received from inbound links 77N to outbound links 78 that correspond to next hops associated with destinations of the packets. U.S. Pat. No. 7,184,437 provides details on an exemplary embodiment of a router that utilizes a radix tree for route resolution. The entire contents of U.S. Pat. No. 7,184, 437 are incorporated herein by reference.

In one example, forwarding component 75 is a rich and dynamic shared forwarding plane, optionally distributed over a multi-chassis router. Moreover, forwarding component 75 may be provided by dedicated forwarding integrated circuits normally associated with high-end routing components of a network router. Further details of one example embodiment of aggregation node 70 can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," the entire contents of which are incorporated herein by reference.

Figure 4:
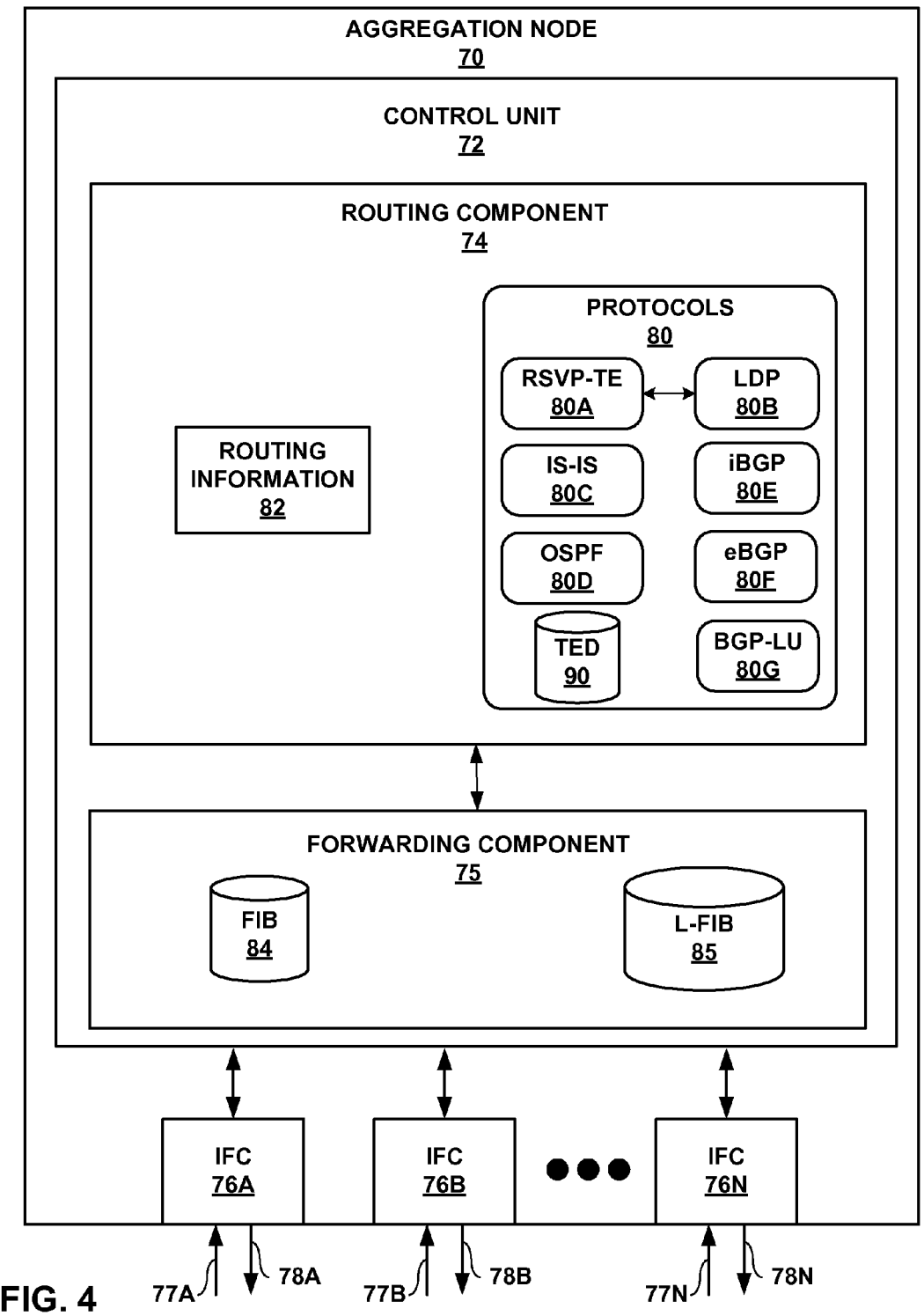
FIG. 4 is a block diagram illustrating an exemplary aggregation node network device in accordance with the disclosure herein.

As shown in FIG. 4, protocols 80 executing within routing component 74 includes one or more MPLS protocols for establishing LSPs, including RSVP-TE 80A, LDP 80B, and BGP-LU 80G. For example, as a traffic-engineering label distribution protocol, RSVP-TE 80A may generate and maintain a traffic engineering database 90, including bandwidth reservations for paths associates with MPLS LSPs. RSVP-TE 80A may include a Constrained Shortest Path First (CSPF) process (not shown) that computes a shortest path or paths for an MPLS LSP based on specified constraints and bandwidth availability information associated with the links within the network. An IGP such as OSPF 80D or IS-IS 80C may, in turn, advertise the calculated bandwidth availability information in traffic engineering database (TED) 90 to other peer routers.

As another example, Label Distribution Protocol (LDP) module 80B may send and receive label mapping messages for establishing a P2P LSP. In some aspects, LDP module 80B may operate in LDP Downstream on Demand (DoD) mode. LDP is referred to herein as a non-traffic-engineering label distribution protocol, in that LDP does not by itself perform traffic-engineering in establishing LDP LSPs.

In accordance with the techniques of this disclosure, LDP module 80B receives the LDP DoD label request message from an access node. In response to determining that the LDP DoD label request message includes a traffic engineering specification object (e.g., a Sender T_Spec object) in a TLV, LDP module 80B passes data from the LDP DoD label request message to RSVP-TE module 80A. That is, LDP module 80B of aggregation node 70 is configured to interpret the presence of this new TLV (or new information in an existing TLV) in the label request message as an indication to select a targeted RSVP-TE LSP segment that meets the TE constraints (e.g., available bandwidth) specified by the new TLV. RSVP-TE module 80A in turn determines a BGP-LU next hop to the destination address specified by a FEC of the LDP DoD label request message by looking up the FEC in routing information 82.

Routing information 82 includes BGP-LU state, such as next hops to use to reach various routes, received in BGP advertisements. After ascertaining what is the BGP-LU next hop for the destination (FEC) of the LDP DoD label request message, RSVP-TE module 80A determines whether a targeted RSVP-TE LSP already exists to that next hop, and if one does not exist, RSVP-TE module 80A establishes the targeted RSVP-TE session. In any case, RSVP-TE module 80A generates an RSVP-TE Path message to send on the targeted RSVP-TE session, wherein the RSVP-TE Path message includes the same Sender T_Spec object. In this manner, aggregation node 70 conveys the Sender T_Spec object to the BGP-LU next hop, but uses RSVP-TE as the signaling protocol rather than BGP-LU. That is, RSVP-TE module 80A refers to the BGP-LU state to determine the next hop for the targeted RSVP-TE LSP, like a forwarding adjacency, but the BGP-LU labels of the BGP-LU state are not actually used in establishing the end-to-end inter-region TE LSP, and the end-to-end inter-region TE LSP does not run over an BGP-LU LSP.

RSVP-TE module 80A may subsequently receive an RSVP-TE Resv message confirming the bandwidth allocation and specifying a label to use for sending traffic on the LSP, and may update L-FIB 85 based on the label. In some examples, LDP module 80B of aggregation node 70 will in turn respond to the upstream AN with an LDP label mapping message with a non-null label allocated by aggregation node 70 in response to RSVP-TE module 80A confirming that the bandwidth reservation has succeeded along the path toward the destination FEC that meets the TE constraints specified in the original LDP DoD label request message.

The BGP-LU state from the aggregation domains to and across the core domain is obtained primarily using BGP with MPLS labels ("labeled BGP/SAFI4" [RFC3107]). A very limited amount of route leaking from ISIS L2 into L1 may also be used. In some examples, ABR and PE nodes in the core may be part of a labeled iBGP mesh, which can be either full mesh or based on route reflectors. These nodes advertise their respective loopback addresses (which are also carried in ISIS L2) into labeled BGP. Each ABR node may have labeled iBGP sessions with all AGN1 nodes inside the aggregation domain that they connect to the core. Additionally the AGN1 nodes also redistribute all the statically configured routes to the AN loopback addresses into labeled BGP, using BGP-LU module 80G.

An approach described herein involves extending the LDP protocol to include a new TLV specifically designed to carry TE constraint information to an LSR so that the LSR can use it to select an appropriate RSVP-TE LSP for the next segment of an overall inter-region TE LSP.

In one embodiment, each of forwarding component 75 and routing component 74 may comprise one or more dedicated processors, hardware, and/or computer-readable media storing instructions to perform the techniques described herein. Forwarding component 75 and routing component 74 may be communicatively coupled by a data communication channel. The data communication channel may be a high-speed network connection, bus, shared-memory or other data communication mechanism.

The architecture of aggregation node 70 illustrated in FIG. 7 is shown for exemplary purposes only. In other embodiments, aggregation node 70 may be configured in a variety of ways. In one embodiment, for example, control unit 72 and its corresponding functionality may be distributed within IFCs 76.

Control unit 72 may be implemented solely in software, or hardware, or may be implemented as a combination of software, hardware, or firmware. For example, control unit 72 may include one or more processors which execute software instructions. In that case, the various software modules of control unit 72, such as protocols 80, may comprise executable instructions stored on a computer-readable medium, such as computer memory or hard disk.

FIG. 5 is a block diagram illustrating an example packet format for a Label Request message in accordance with the techniques of this disclosure. An LSR, such as AN 12A (FIGS. 1-2), sends the Label Request message to an LDP peer to request a binding (mapping) for a FEC. In accordance with the techniques of this disclosure, the Label Request message includes a sender traffic specification object that indicates information about traffic to be sent by the access node.

FIG. 5 illustrates one example encoding for the Label Request message 100, which includes a label request field 102, a message length field 104, a message ID field 106, a FEC TLV field 108, a traffic engineering (TE) specification TLV field 110, and an optional parameters field 112. In one example, label request field 102 is a message type field that indicates the message type as as Label Request message. Message length field 104 indicates a length of label request message 100. Message ID field 106 is a value, such as a 32-bit value, used to identify Label Request message 100. FEC TLV field 108 specifies the FEC for which a label is being requested. Labels are bound to Forwarding Equivalence Classes (FECs). A FEC is a list of one or more FEC elements. The FEC TLV encodes FEC items. Example encoding of the FEC TLV is found in "LDP Specification," RFC 5036, October 2007, the entire contents of which are incorporated by reference herein. In some examples, the FEC contained in FEC TLV field 108 may be an IPv4 or an IPv6 FEC, such as an address of the access node to which an end-to-end traffic engineering LSP is desired to be established (e.g., AN 12B of FIG. 1). In other examples, the FEC may be a newly defined FEC that specifies information such as <source, destination, tunnel ID, extended tunnel ID, LSP ID> which is similar to an RSVP LSP FEC.

TE specification TLV field 108 is a TLV carrying a sender traffic specification object, such as a Sender T_Spec as described in RFC 2210. For example, TE specification TLV field 108 may indicate an amount of bandwidth to be reserved on each segment of an end-to-end inter-region TE LSP. In other examples, the Sender T_Spec traffic specification specifies one or more of a token bucket rate, token bucket size, peak data rate, minimum policed unit, and maximum packet size. Optional Parameters field 112 is a variable length field containing zero or more parameters, each encoded as a TLV.

Figure 6:
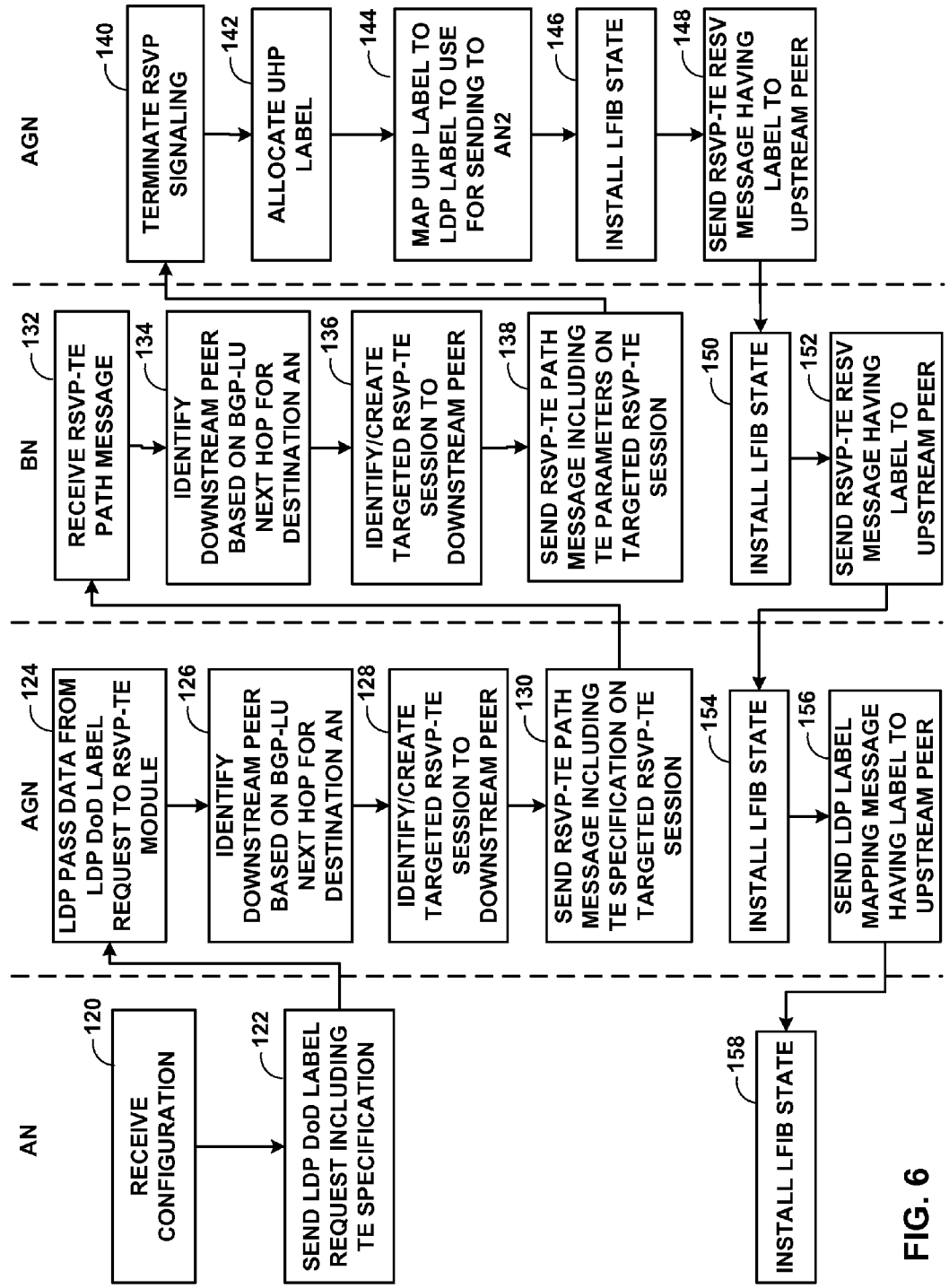
FIG. 6 is a flowchart illustrating an example mode of operation of network devices in a network in using the techniques described herein.

FIG. 6 is a flowchart illustrating an example mode of operation of network devices in a network in using the techniques described herein. FIG. 6 will be described for purposes of example with respect to FIGS. 1-5. For example, AN 12A receives configuration information (120), such as TE constraints and one or more network addresses (e.g., IP addresses) for remote ANs in other regions to which to establish one or more inter-region TE LSPs satisfying the TE constraints. AGN 16A may also initially establish RSVP-TE sessions and one or more targeted RSVP-TE sessions with other devices, such as with BN 20A, as described above with respect to FIGS. 1-2.

In the example of FIG. 6, to initiate establishment of an end-to-end inter-region TE LSP, AN 12A sends an LDP DoD label request message that includes a TE specification, e.g., a TE constraint such as bandwidth), having a FEC that specifies the destination (egress) of the end-to-end inter-region TE LSP as AN 12B (122). AGN 16A receives the label request message and LDP module 80B passes data from the label request message to RSVP-TE module 80A (124). In response to receiving this data, RSVP-TE module 80A determines a BGP-LU next hop to the destination address specified by a FEC of the LDP DoD label request message by looking up the FEC in routing information 82 (126). After ascertaining what is the BGP-LU next hop, RSVP-TE module 80A determines whether a targeted RSVP-TE session was already used to establish an inner RSVP LSP to that BGP next hop and that satisfies the TE constraints, and if one does not exist, RSVP-TE module 80A establishes the targeted RSVP-TE session (128). In any case, RSVP-TE module 80A generates and sends an RSVP-TE Path message on the targeted RSVP-TE session, wherein the RSVP-TE Path message includes the same Sender T_Spec object (130).

BN 20A receives the RSVP-TE path message (132), and similarly identifies a downstream peer based on the BGP-LU next hop for the FEC (AN 12B) (134), and identifies or creates an RSVP-TE LSP that satisfies the TE constraints to the identified downstream peer using a targeted RSVP-TE session (136). This process continues at each BN (such as BN 20B) for however many intermediate networks are present on the way. AGN 16B eventually receives the RSVP-TE path message. Upon determining that the destination AN 12B specified by the FEC of the RSVP-TE path message is local to itself, RSVP-TE module 80A of AGN 16B terminates the RSVP signaling (140), allocates to the FEC an ultimate hop popping (UHP) label for sending traffic over targeted RSVP-TE LSP 30C (142), and maps the UHP label to an LDP label used to reach AN 12B, e.g., on LDP LSP 28B (FIG. 2) (144). AGN 16B stores the allocated UHP label and mapping to the LDP label to forwarding state, such as L-FIB 85 (146). AGN 16B sends an RSVP-TE Resv message to BN 20B having the allocated UHP label-to FEC binding (148).

BN 20B receives the RSVP-TE Resv message from AGN 16B, and installs the allocated label to L-FIB 85. In some examples, RSVP-TE LSP 30C may tunnel traffic through the hop-by-hop RSVP-TE LSP 25C, in which case BN 20B may store state indicating a label stack to use for sending traffic on LSP 30C, with an outer label for RSVP-TE LSP 25C and an inner label for targeted RSVP-TE LSP 30C. BN 20B in turn allocates a label for sending traffic over targeted RSVP-TE LSP 30B, stores the label binding to forwarding state, and sends a RSVP-TE Resv message 39C to AGN 16A indicating the allocated label.

BN 20A receives the RSVP-TE Resv message (in the example of FIG. 2, from BN 20B), and installs the allocated label to L-FIB 85 (150). In some examples, RSVP-TE LSP 30B may tunnel traffic through the hop-by-hop RSVP-TE LSP 25B, in which case BN 20A may store state indicating a label stack to use for sending traffic on LSP 30B, with an outer label for RSVP-TE LSP 25B and an inner label for targeted RSVP-TE LSP 30B. BN 20A in turn allocates a label for sending traffic over targeted RSVP-TE LSP 30A, stores the label binding to forwarding state, and sends a RSVP-TE Resv message 39A to AGN 16A indicating the allocated label (152).

AGN 16A receives the RSVP-TE Resv message, and RSVP-TE module 80A installs the allocated label to L-FIB 85 (154). In some examples, RSVP-TE LSP 30A may tunnel traffic through the hop-by-hop RSVP-TE LSP 25A, in which case AGN 16A may store state indicating a label stack to use for sending traffic on LSP 30A, with an outer label for RSVP-TE LSP 25A and an inner label for targeted RSVP-TE LSP 30A. RSVP-TE module 80A invokes LDP module 80B of AGN 16A, which in turn allocates an LDP label for sending traffic over LDP LSP 28A, stores the label binding to forwarding state, and sends an LDP label mapping message to AN 12A indicating the allocated label (156). AN 12A receives the LDP label mapping message and LDP module 50 installs the appropriate forwarding state to L-FIB 54 (158).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium or computer-readable storage device, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
  receiving, by an aggregation node, a label request message generated by an access node, wherein the label request message specifies a forwarding equivalence class (FEC) for traffic to be sent by the access node, and data that indicates constraint information for the traffic to be sent by the access node;
  by the aggregation node, establishing a first session for a traffic-engineering label distribution protocol with a next hop adjacent to the aggregation node and positioned within a same network as the aggregation node;
  by the aggregation node, establishing a second session for the same traffic-engineering label distribution protocol, wherein the second session has a remote next hop positioned at a border between the network and a second network; and sending a message destined for the remote next hop over the second session for establishing an end-to-end traffic engineered label switched path for the FEC specified in the label request message, wherein the message includes the data indicating the constraint information, which was received by the aggregation node in the label request message from the access node.

2. The method of claim 1, further comprising:
responsive to receiving the label request message and by the aggregation node, looking up the FEC specified by the label request message in routing information stored by the aggregation node;
determining the remote next hop to which to send the message to reach the FEC based on the lookup in the routing information;
sending the message to the determined remote next hop.

3. The method of claim 2, wherein the routing information comprises Border Gateway Protocol labeled unicast (BGP-LU) state maintained by the aggregation node,
wherein determining the remote next hop comprises determining a BGP next hop based on the BGP-LU state.

4. The method of claim 1, wherein sending the message comprises sending a Resource Reservation Protocol with Traffic Engineering extensions (RSVP-TE) Path message over the second session, further comprising:
responsive to receiving the label request message and by the aggregation node, generating the RSVP-TE Path message that includes a sender traffic specification object, wherein the sender traffic specification object was specified by the label request message and includes the data that indicates constraint information.

5. The method of claim 4,
wherein establishing the second session comprises establishing a targeted RSVP-TE LSP to the identified next hop, and
wherein sending the RSVP-TE Path message to the identified next hop comprises sending the RSVP-TE Path message on the targeted RSVP-TE LSP.

6. The method of claim 1, wherein receiving the label request message comprises receiving a label request message generated by the access node in accordance with a non-traffic-engineering label distribution protocol.

7. The method of claim 6, wherein the non-traffic-engineering label distribution protocol comprises Label Distribution Protocol (LDP) wherein the label request message comprises an LDP Downstream on Demand (DoD) message that is extended to include a sender traffic specification object specifying the data that indicates constraint information.

8. The method of claim 7, wherein the sender traffic specification object is specified by a bandwidth TLV of the LDP DoD message.

9. The method of claim 1, wherein the sender traffic specification object specifies an amount of minimum bandwidth to be reserved on each segment of the end-to-end traffic engineered label switched path.

10. The method of claim 1,
wherein the FEC comprises a destination address of a service node to which the end-to-end traffic engineered label switched path is to be established.

11. The method of claim 1,
wherein the FEC comprises a destination address of a second access node to which the end-to-end traffic engineered label switched path is to be established.

12. The method of claim 11,
wherein the destination address comprises one of an Internet Protocol version Four (IPv4) IP address and an Internet Protocol version Six (IPv6) IP address.

13. The method of claim 1,
wherein the FEC specifies a source address, destination address, tunnel identifier, and label switched path identifier.

14. The method of claim 1,
wherein the sender traffic specification object indicates information about traffic to be sent by the access node in a form that is usable by a Quality of Service (QoS) control service.

15. A network device comprising:
a physical interface to receive a label request message generated by an access node, wherein the label request message specifies a forwarding equivalence class (FEC) for traffic to be sent by the access node, and data that indicates constraint information for the traffic to be sent by the access node;
a control unit to establish a first session for a traffic-engineering label distribution protocol with a next hop adjacent to the network device and positioned within a same network as the network device, and to establish a second session for the same traffic-engineering label distribution protocol, wherein the second session has a remote next hop positioned at a border between the network and a second network;
a traffic-engineering label distribution protocol module to generate a message destined for the remote next hop over the second session for establishing an end-to-end traffic engineered label switched path for the FEC specified in the label request message, wherein the message includes the data indicating the constraint information, which was received by the network device in the label request message from the access node; and
a forwarding component to send the message over the second session.

16. The network device of claim 15,
wherein the responsive to receiving the label request message the traffic-engineering label distribution protocol module looks up the FEC specified by the LDP DoD label request message in BGP labeled unicast (BGP-LU) routing information stored by the network device;
wherein the traffic-engineering label distribution protocol module determines the remote next hop comprising a BGP next hop to which to send the message to reach the FEC based on the lookup in the BGP-LU routing information.

17. The network device of claim 15, wherein responsive to receiving the label request message the traffic-engineering label distribution protocol module generates generating an Resource Reservation Protocol with Traffic Engineering extensions (RSVP-TE) Path message that includes a sender traffic specification object, wherein the sender traffic specification object was specified by the label request message and includes the data that indicates constraint information.

18. The network device of claim 17, wherein establishing the second session comprises establishing a targeted RSVP-TE LSP to the identified next hop, and wherein sending the RSVP-TE Path message to the identified next hop comprises sending the RSVP-TE Path message on the targeted RSVP-TE LSP.

19. The network device of claim 15, wherein the label request message comprises a Label Distribution Protocol (LDP) Downstream on Demand (DoD) message that is extended to include a sender traffic specification object specifying the data that indicates constraint information.

20. A computer-readable storage medium comprising instructions for causing a programmable processor to:
- receive a Label Distribution Protocol (LDP) Downstream on Demand (DoD) label request message generated by an access node, wherein the LDP DoD label request message specifies a forwarding equivalence class (FEC) for traffic to be sent by the access node, and data that indicates constraint information for the traffic to be sent by the access node;
- establish a first session for Resource Reservation Protocol with Traffic Engineering extensions (RSVP-TE) with a next hop adjacent to an aggregation node and positioned within a same network as the aggregation node;
- establish a second session for RSVP-TE, wherein the second session has a remote next hop positioned at a border between the network and a second network;
- responsive to receiving the label request message and by the aggregation node, look up the FEC specified by the LDP DoD label request message in BGP labeled unicast (BGP-LU) routing information stored by the aggregation node;
- determine the remote next hop comprising a BGP next hop to which to send the message to reach the FEC based on the lookup in the BGP-LU routing information; and
- send a message destined for the BGP next hop over the second session for establishing an end-to-end traffic engineered label switched path for the FEC specified in the label request message, wherein the message includes the data indicating the constraint information, which was received by the aggregation node in the LDP DoD label request message from the access node.

* * * * *